K. E. PEILER.
GLASS FEEDING APPARATUS.
APPLICATION FILED MAR. 16, 1915.

1,332,405.

Patented Mar. 2, 1920.
2 SHEETS—SHEET 1.

Witnesses:
J. S. Grotta
Wm. A. Zeiser

Inventor
Karl E. Peiler
by Wm H Honiss
Atty.

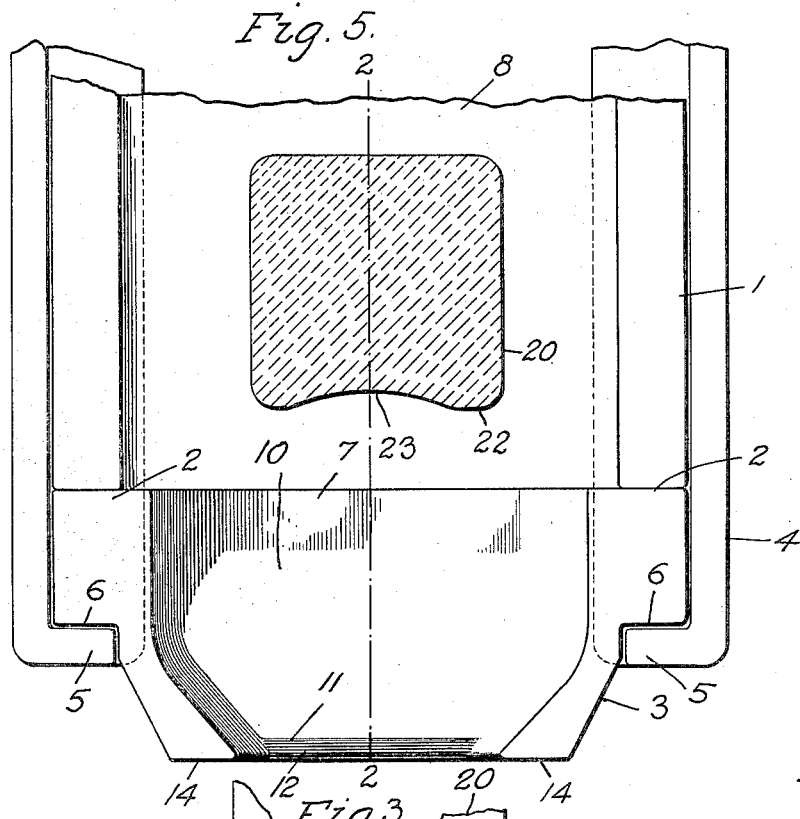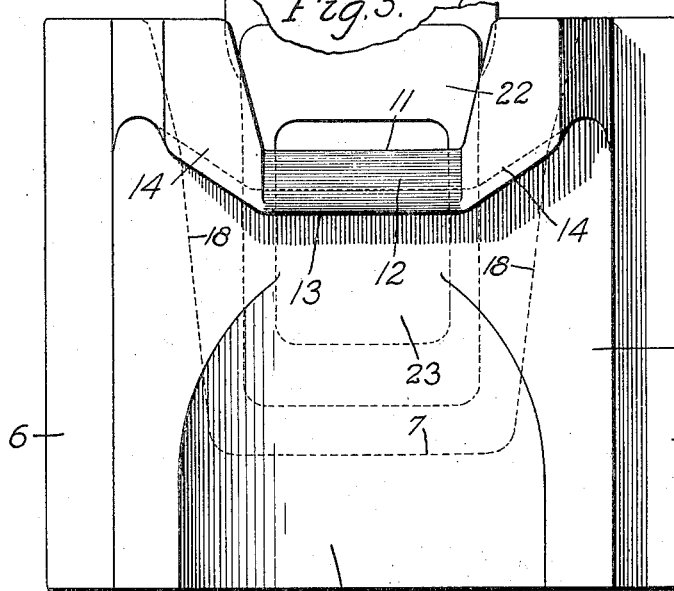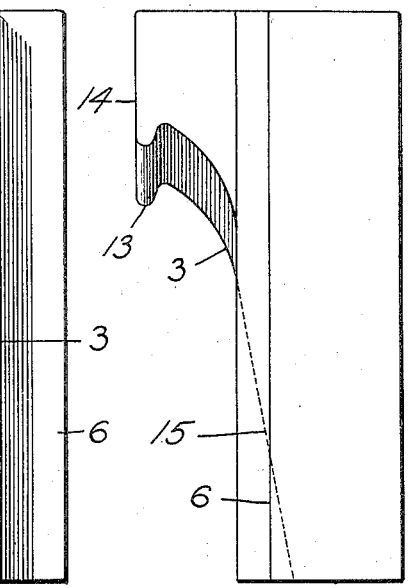

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-FEEDING APPARATUS.

1,332,405.  Specification of Letters Patent.  Patented Mar. 2, 1920.

Application filed March 16, 1915. Serial No. 14,662.

*To all whom it may concern:*

Be it known that I, KARL E. PEILER, a citizen of the United States, residing at Hartford, in the county of Hartford and State of Connecticut, have invented new and useful Improvements in Glass-Feeding Apparatus, of which the following is a specification.

This invention is an improved apparatus for delivering molten glass from a glass furnace, tank, or other reservoir or receptacle. It is herein illustrated as being embodied in a device for delivering separated charges or gathers of glass, to be fed to shaping molds, or to other receptacles, for any purpose.

Figure 1:
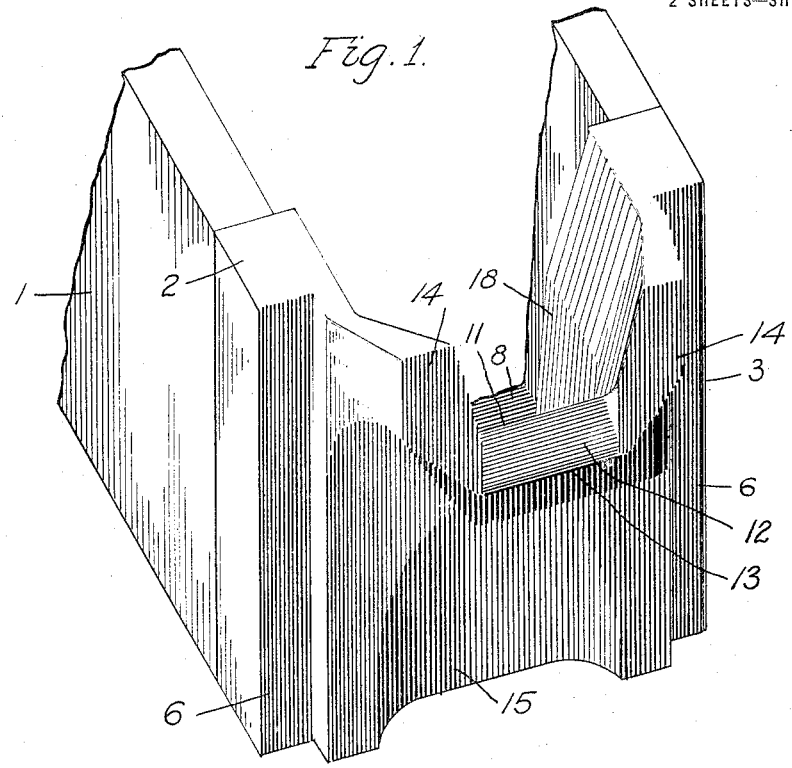
Figure 2:
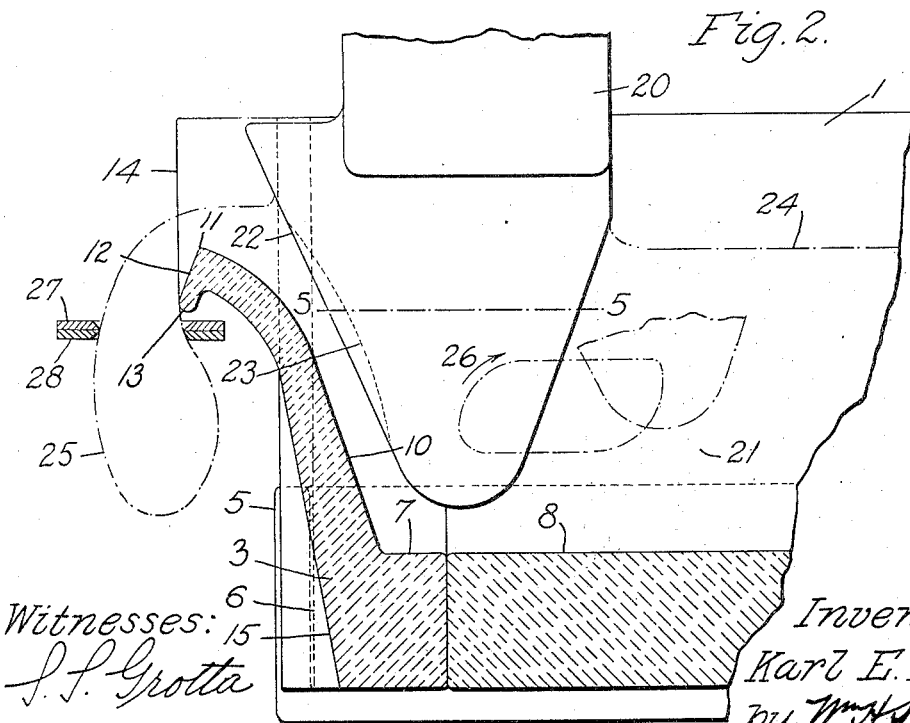

Figure 1 of the drawings is an isometric view of the delivery spout, which is one of the features of the invention. Fig. 2 is a side view in section taken on the line 2—2 of Fig. 5, showing the spout and the displacer used in conjunction therewith. Fig. 3 is a front elevation and Fig. 4 a side elevation of the spout of Figs. 1 and 2. Fig. 5 is a plan view projected from Fig. 3, showing the displacer in section taken on the line 5—5 of Fig. 2.

The difficulties attending the feeding of molten glass, especially in separated charges or gathers of uniform size and uniform plastic condition are well known. They are due mainly to the inherent viscosity of the glass, which flows very slowly, resists separation, and is liable to receive shear marks or other scars at its separated surfaces, which marks or scars tend to persist in the glass and mar the structure or appearance of the resulting pieces of glassware. Moreover, the glass when gathered by pulling or drawing action is liable to be drawn out and folded over or wound upon itself, thus imprisoning air more or less, and also tends to form cords or strings, which becoming chilled, and remaining so, fail to reabsorb homogeneously into the respective charges.

In the present invention these difficulties are overcome or avoided by means of a specially adapted spout and displacer, of refractory material, by which the glass is delivered in a succession of waves or surges, propelled by pushing action instead of being drawn by pulling action, whereby the glass is fed in compact gathers, the surfaces of which are mainly of smooth convex contour, having practically no reëntrant angles or folds or sharply protuberant fins, cords, or other sharply defined contour irregularities, tending to cause or permit the imprisoning of air, the formation of cold seams or scars, or any injuriously unequal chilling of the surface of the gather.

The spout herein illustrated is preferably employed in conjunction with a trough or conduit 1, extending from the side of the furnace or tank from which the supply of molten glass is obtained, and in which a continuous supply is preferably maintained. The base portion 2, of the spout 3, fits against the end of the conduit and both may be supported in any convenient way. As herein shown they are supported by means of brackets 4 projecting from the furnace structure, and having flanges 5 which receive the shouldered or flanged portions 6 of the spout, thus supporting the weight of the spout and also holding it against the end of the conduit. This permits the spout to be readily removed from the conduit and replaced by another spout, in case of damage, or to substitute a different size of spout.

The lower wall or floor 7 of the spout preferably, as herein shown, coincides with the floor 8 of the conduit. From the floor the front wall 10 rises abruptly, the top or crown 11 of the front wall forming what might be termed the threshold of the outlet. Outside of this threshold, the end or edge of the wall has a sharp downward inclination 12 beneath and behind which is a depending lip 13, which serves to conduct the glass clear of the front wall and prevent it from dribbling down the face of that wall. The side or wing walls 14 project to or beyond the threshold 11 of the outlet (Figs. 1 and 2) and extend above the highest level reached by the waves or surges of glass extruded through the outlet. These wings thus confine the glass within definite sidewise limits, approximating the cross-sectional width desired for the gathers, which are thus adapted to the size and form of the glassware to be made. The ends of the lip 13 at each side of the outlet are inclined upwardly to meet the walls 14 to prevent the glass from climbing or creeping around the ends of the lip, thus spreading itself beyond the desired width. The outer surface of the wall is also made concave at 15 to increase the clearance between the wall and the suspended glass.

The width between the side walls 18 of the spout is adapted to the width of the displacer 20, being enough wider than the displacer to leave suitable clearance between each of the walls and the adjacent side of the displacer. It is unnecessary to have the side walls and floor fit the sides and end of the displacer at all closely, as the viscous character of the glass enables it to act as a packing to prevent any considerable backward flow of the glass past the sides and end of the displacer, as the latter is moved forward. On the other hand, the walls of the conduit are preferably made enough wider than the displacer, as shown in Fig. 5 to enable the glass to flow freely from the conduit to the spout, past the sides of the displacer, when the latter is in its retracted position shown in full lines in Fig. 5.

Toward the outlet end of the spout the side walls 18 converge rapidly toward each other, constituting with the forwardly inclined floor or front wall 10 a progressively narrowing passage in which each wave or surge of glass pushed forward by the displacer is compacted and piles up above the level of the threshold as it approaches the outlet, this action being somewhat like that of a tidal wave or bore carried up a similarly converging tideway. The successive waves, thus compacted, and raised above the level of the outlet threshold 11, are extruded through the outlet, and sink down in suspension from the lip 13.

The displacer 20, which is made of suitable refractory material, is suspended in the spout and moved back and forth therein. The suspending and operating mechanism for the displacer forms no part of the present invention, and is therefore not illustrated herein. Mechanism suitable for thus suspending and operating the displacer is however shown, described and claimed in my Patent No. 1,277,254, granted August 27, 1918. The front face 22 of the displacer is forwardly inclined in approximate accordance with the forward inclination of the front wall 10 of the spout (Fig. 2), and serves, after moving forward a wave or surge of glass, to extrude the desired amount thereof upwardly between the front face 22 of the displacer and the front wall 10. To direct and centralize the flow of the extruding column of glass, that front face is preferably made concave as shown at 23 in Figs. 2 and 5. Approximately the rearward position of the displacer is shown in full lines in Fig. 5 and by dot and dash lines in Fig. 2, its approximate forward position being shown by full lines in Fig. 2. These positions, as well as the length and depth of the movements of the displacer may and should be varied to suit various conditions, such as the depth of the glass and the size of the charge desired.

The conduit 1 and spout 3 are preferably inclosed and protected by a suitable hood (not shown) to inclose and retain the heat of the glass, thus preventing the chilling of the glass surfaces by exposure to drafts of air. The hood is slotted to allow the displacer 20 to make its required movements, the ends of the slot being in turn covered by baffle plates carried by the displacer or its supports.

In operation, a suitable level of glass, indicated by the line 24, preferably somewhat below the level of the threshold 11 of the outlet is supplied to the conduit 1. The displacer mechanism, timed in accordance with the features of the machine or apparatus to which charges of glass are to be delivered, moves the displacer back and forth in a path which may for purpose of the present description be in accordance with the line 21. As the displacer is carried forward from its rearward position shown in Fig. 5 to its forward position shown in Fig. 2, it carries before it a wave or surge of glass, which as it reaches the converging walls of the spout is piled up and flows out of the outlet over the threshold 11 and down the inclined face 12 of the outlet, taking a suspended form which is approximately indicated at 25 in Fig. 2. As the discharged portion of the wave thus passes beyond the outlet, the displacer 20 is retracted in the direction of the arrow 26, thus leaving room for and drawing back the glass adhering to and adjacent to the displacer. The consequent sinking back of the glass which is on the inner side of the threshold aids in separating the gather of glass from the wave, which is then separated by any suitable shear mechanism indicated by the blades 27 and 28, just below the lip 13. The remaining stub of glass adhering to the main body of the glass is drawn back toward the threshold, and, not being chilled, is quite thoroughly reabsorbed into the succeeding wave or surge as it is brought forward practically as a new formation from which the succeeding charge is delivered and severed in the same way.

I claim as my invention:—

1. A delivery spout for molten glass, having an outlet, side walls converging toward the outlet, and a front wall, the inner surface of which inclines steeply upward to the outlet and inclines steeply downward beyond the outlet, the said inclines forming an acute angle with each other.

2. A delivery spout for molten glass, having an outlet, side walls converging toward the outlet, and a front wall, the surface of which inclines steeply upward to the outlet and inclined steeply downward beyond the outlet, terminating at a depending lip, which forms an acute angle with the said upwardly inclined surface.

3. A delivery spout for molten glass, the front wall of which is forwardly inclined and terminates in a relatively short depending lip inclined downwardly at an acute angle with the forwardly inclined wall, and having side walls, the inner faces of which converge abruptly toward each other and terminate at the sides of the lip, forming with the front wall an outlet passage leading over the depending lip.

4. A delivery spout for glass furnaces and the like, having a forwardly inclined front wall terminating in a depending lip forming an acute angle with the forwardly inclined portion, and having side walls, the inner faces of which converge abruptly toward and merge with the upper end of the front wall, leaving between them an outlet above the depending lip.

5. The combination, with a glass melting furnace, having a delivery conduit, of a spout having a base portion fitting the end of the conduit, and having a passage for the glass, forming a continuation of the conduit and narrowing to an outlet located above the level of the glass in the conduit, and means for removably supporting the spout at the end of the conduit.

6. The combination, with a glass melting furnace, having a delivery conduit, of a removable spout having a flanged base fitting the end of the conduit, and having walls forming a continuation of the conduit walls, and converging to an outlet above the level of the glass, and a flanged bracket supporting the spout and holding it against and in alinement with the conduit.

7. A removable and renewable delivery spout for glass furnaces and the like, having a base for seating against the furnaces at an outlet thereof, with the side walls and front wall of the spout constituting an extension of the furnace outlet, the inner faces of the said walls converging forwardly and upwardly to form a relatively small outlet at or above the level of the glass, thereby forming a narrowing delivery passage for the glass from the furnace outlet to the outlet of the spout.

8. Apparatus for feeding molten glass, including a container for the glass, provided with side walls converging to an outlet above the level of the glass, and a displacer of a width not less than the width of the outlet disposed in the glass, and movable between the said converging walls toward and from the outlet.

9. A displacer for extruding molten glass from a glass furnace or the like, having a concaved front face.

10. A displacer for extruding molten glass from a glass furnace or the like, having a forwardly inclined and concaved front face.

11. Apparatus for feeding molten glass, including a spout having a forwardly inclined front wall and a displacer having a forwardly inclined front face coöperating with the inclined front wall of the spout to extrude the glass between them over the top of the front wall.

12. Apparatus for feeding molten glass, including a spout having a front wall, the inner face of which is forwardly inclined, and side walls the inner faces of which converge toward each other and join the front wall to form an outlet for the glass, and a displacer disposed within the spout and having a forwardly inclined front surface coöperating with the front wall of the spout to extrude the glass upwardly between them, through the said outlet.

13. Apparatus for feeding molten glass, including a container for the glass provided with an outlet, the bottom of which is approximately at the level of the glass in the container, and having side walls converging toward the outlet and extending outwardly beyond the highest portion of the bottom of the outlet, and a displacer disposed in the glass, and movable between the converging walls toward and from the outlet to displace the glass in successive waves through the outlet, the side walls being extended above the highest waves thus produced.

14. Apparatus for feeding molten glass, including a spout having a front wall, the inner surface of which is forwardly inclined, and having side walls, the inner faces of which converge toward the end of the front wall, to form an outlet for the glass, and a displacer movable between said side walls, and having an inclined forward face coöperating with the inclined surfaces of the front wall, to propel the glass toward the end of the spout and extrude it through the outlet.

In testimony whereof I have signed my name to this specification in the presence of two subscribing witnesses, this 11th day of March, 1915.

KARL E. PEILER.

Witnesses:
K. A. Row,
Phil S. Bentel.